Patented Aug. 13, 1935

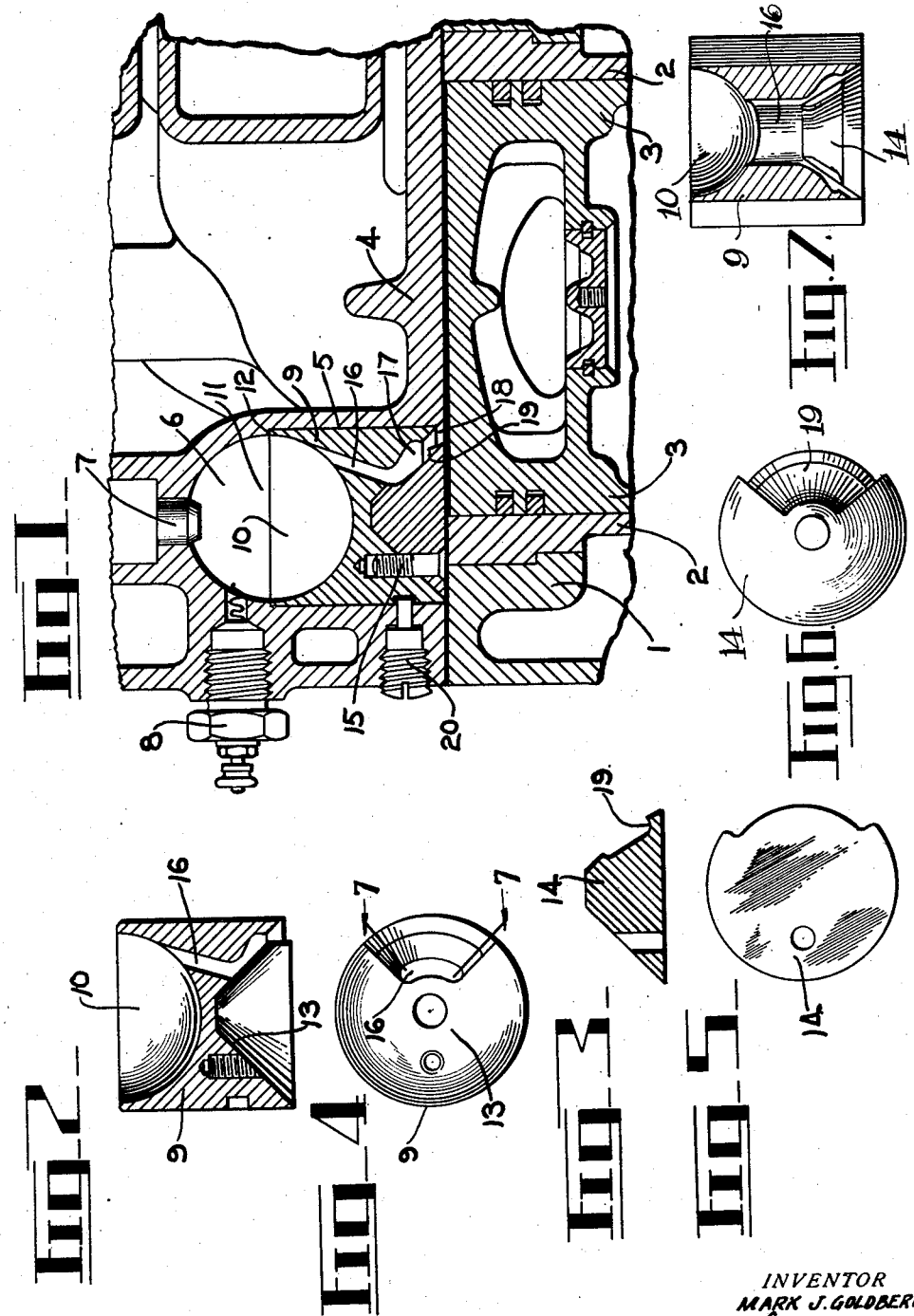

2,011,048

UNITED STATES PATENT OFFICE 2,011,048

COMBUSTION CHAMBER

Mark J. Goldberg, Beloit, Wis., assignor to Campbell Wyant & Cannon Foundry Company, Muskegon Heights, Mich., a corporation of Michigan Application June 14, 1933, Serial No. 675,664

2 Claims. (Cl. 123—32)

This invention relates to improvements in combustion chambers of internal combustion engines of the Diesel type in which type of engine the combustion of fuel oil and oxygen is caused to take place in a chamber separated from the engine cylinder and connected thereto by a passage.

The object of the invention is to provide a structure which will cause a more intimate or homogeneous mixture of the fuel oil and oxygen whereby a more thorough combustion takes place resulting in higher efficiency and elimination of smoke caused by improper combustion. The invention also provides a structure which is simple to make and effective and durable in use and is arranged so that its component parts may be readily disassembled for cleaning.

The invention is hereinafter more fully described and particularly pointed out in the claims, reference being had to the accompanying drawing in which, Fig. 1 is a fragmentary sectional elevation of a portion of the upper part of the cylinder and the cylinder head of a Diesel engine showing the combustion chamber and passages of this invention applied thereto.

Fig. 2 is a sectional elevation of one of the members in which is formed a lower part of the combustion chamber and a portion of the gas passage.

Fig. 3 is a sectional elevation of another member of the structure in which a part of the gas passage is formed.

Fig. 4 is an inverted plan view of the member shown in Fig. 2, and

Fig. 5 is an inverted plan view of the member shown in Fig. 3.

Fig. 6 is a plan view of Fig. 3.

Fig. 7 is a view in section taken along the line 7—7 of Fig. 4.

Like reference numbers refer to like parts in all of the figures.

The numeral 1 represents the engine cylinder casting which, in the structure shown, is provided with a cylinder sleeve 2. The piston 3 is located within the cylinder sleeve 2 and reciprocates therein in the customary manner. A cylinder head 4 is located on the upper end of the casting 1 and covers the upper end of the cylinder cavity and is firmly attached in place by suitable conventional means not shown. The engine is provided with the ordinary inlet and exhaust valves, not shown, which respectively admit air into the cylinder and exhaust the burned gases of combustion therefrom, A cylindrical recess 5 is provided in the lower side of the cylinder head 4 and terminates at its upper end in a dome or semi-spherical shape 6 which dome forms the upper half of a combustion chamber. A fuel injection valve 7, of conventional type, enters the combustion chamber through the upper side of the dome 6 and an ignition device, as a spark plug 8, may also be located in the dome 6.

A cylindrical member 9 is provided to fit the cylindrical opening 5 and it has a semi-spherical depression 10 in its upper surface which, when the parts are assembled, serves in conjunction with the dome 6 to form a spherical combustion chamber, which combustion chamber is indicated as a whole as 11. A shoulder 12 is formed at the juncture between the upper end of the cylindrical opening 5 and the dome 6 against which shoulder the upper end of the cylindrical member 9 engages when the parts are assembled.

The lower surface of the cylindrical member 9 is provided with a conical, or frustro-conical chamber 13 in which is located a similarly shaped block 14 which block is held in place by a screw 15. A passage 16 leads tangentially from the periphery of the lower portion of the spherical combustion chamber 11 and extends through the cylindrical member 9 and communicates at substantially a 90° angle with a turbulence chamber 17 which in turn communicates with a discharge opening 18 leading directly to the engine cylinder, this discharge opening 18 being located at approximately 120° to the passage 16. Both the turbulence chamber 17 and the discharge opening 18 are formed by cavities in the respective adjacent surfaces of the cylindrical member 9 and the conical block 14, these cavities complementing each other, when the parts are assembled, to form a chamber and discharge opening of the desired shape.

The inclined surfaces of the conical block 14 and the conical chamber 13 are respectively provided with the said depressions or cavities so shaped that when assembled the turbulence chamber 17 is formed with a shelf 19 against which the current of gas travelling through the passage 16 impinges and the said cavities also form the discharge opening 18 leading from the chamber 17. By this manner of construction the parts may be easily and accurately constructed. The cavities, which form the turbulence chamber 17 and the discharge opening 18, being in accessible surfaces of the parts, are much more easy to make than when formed interiorly of a solid member.

The parts are assembled by inserting the cylindrical member 9 into the cylindrical opening 5 where it is properly located and retained by a screw 20 which enters a depression in the outer surface of the member 9 and the conical block 14 is inserted in the conical chamber 13 of the member 9 where it is properly located and retained by the screw 15. With these parts so assembled in the cylinder head 4 the cylinder head is located on the cylinder casting 1 and when so located the lower edge of the member 9 and the lower surface of the block 14 engage the upper surface of the cylinder casting 1 and respectively hold the parts in the cylinder head 4.

In operation of this invention a charge of air is drawn into the cylinder by downward movement of the piston in the ordinary way and on upward movement during the compression stroke of the piston the air is compressed in the cylinder and, as is the case in engines of the Diesel type, the compression space in the cylinder proper is very small and the air is forced into the combustion chamber 11 through the passages 16, 17, and 18 where it is compressed to a high degree. This high compression of the air causes it to attain a high temperature and at the proper time in the engine's operation a charge of fuel is injected through the injection valve 7 into the combustion chamber 11 and its contents of highly compressed heated air whereupon combustion occurs spontaneously.

The mere injection of fuel will not cause it to mix with the entire charge of compressed air and without means for completely mixing the fuel and air, complete combustion will not occur which causes inefficient power production, carbon accumulation on the inner surface of the engine and smoke issuance from the exhaust.

In the present construction after initial combustion occurs in the combustion chamber, the expanding gases cause downward movement of the piston in the cylinder and a rush of partially mixed air and fuel from the combustion chamber 11 to the cylinder. In this movement a whirling action of the gases occurs in the combustion chamber 11 because the gas is emitted tangentially therefrom through the passage 16 and the gas travelling at a high rate from the passage 16 enters the turbulence chamber 17 and impinges against the shelf 19 therein setting up a great turbulence of gas in this chamber, which causes an intimate homogeneous mixture of the air and fuel, which mixture then emerges through the discharge opening 18 into the cylinder.

In the normal operation of the engine the above action occurs very rapidly and it results in a partial ignition of the combustible charge in the combustion chamber and as the gas and air become thoroughly mixed in the passages and turbulence chamber the combustion, when entering the cylinder above the piston where mixture with the air in the cylinder takes place, causes further combustion which results in a continuous expansion of the gases due to combustion during a large part of the power stroke of the piston.

It is to be understood that other sequences in the operation of the engine occur in the customary manner and that the operation of the engine has been herein described only insofar as it pertains to this invention. The invention is defined in the appended claims and is to be considered comprehensive of all forms of structure coming within their scope.

I claim:

1. In an internal combustion engine having a cylinder head and cylinder, a cylindrical recess in said cylinder head, said cylindrical recess being offset laterally from the cylinder and having a dome shaped end, a cylindrical member removably inserted in said recess and having a cup-shaped cavity cooperating with said dome shape of the recess to form a combustion chamber, a tapered recess in the outer end of said cylindrical member, a tapered block removably inserted in said tapered recess and contacting the walls of the recess, coacting cavities in the enjoining surfaces of said tapered block and tapered recess coacting to form chambers and passages and a passage extending through said cylindrical member, said passages and chambers joining to form a communication between said combustion chamber and the engine cylinder, said tapered block resting upon the end of the cylinder for the purpose described.

2. In an elongated device of the character described, a body having a recess with a closed end and an open end, a member closing the open end of the recess to form a chamber therewithin, said member also having a frusto-conical recess therein, the smaller portion of this frusto-conical recess being located closer to the chamber in the body than the larger portion thereof, the closure member having an opening extending from the smaller portion of the frusto-conical recess at an angle of substantially 120 degrees with respect to the wall thereof whereby a passageway leads to the chamber, the said wall being partly cut away to form a pasageway leading to the outer end of the closure member, a block fitting into the frusto-conical recess, and means for maintaining the block detachably but tightly in position whereby it snugly engages the walls of said frusto-conical recess, said block being cut away oppositely to the passageway to form a turbulence chamber.

MARK J. GOLDBERG.